United States Patent [19]

Truskalo

[11] Patent Number: 5,596,250
[45] Date of Patent: Jan. 21, 1997

[54] TIMING OF DEFLECTION WAVEFORM CORRECTION CIRCUIT

[75] Inventor: Walter Truskalo, Indianapolis, Ind.

[73] Assignee: Thomson Consumer Electronics, Inc., Indianapolis, Ind.

[21] Appl. No.: 637,030

[22] Filed: Apr. 24, 1996

Related U.S. Application Data

[63] Continuation of Ser. No. 165,202, Dec. 13, 1993, abandoned.

[51] Int. Cl.$^6$ ........................................ H01J 29/56
[52] U.S. Cl. ............................................ 315/371
[58] Field of Search ........................ 315/371, 368.18, 315/368.19, 368.21, 368.22

[56] References Cited

U.S. PATENT DOCUMENTS

| | | |
|---|---|---|
| 3,689,797 | 9/1972 | Hetterscheid et al. . |
| 4,216,392 | 8/1980 | Valkestija . |
| 4,225,809 | 9/1980 | Owaga et al. . |
| 4,362,974 | 12/1982 | Deitz . |
| 4,516,168 | 5/1985 | Hicks . |
| 4,625,154 | 11/1986 | Willis . |
| 4,965,496 | 10/1990 | Haferl ................................. 315/371 |
| 5,043,637 | 8/1991 | Gries et al. . |
| 5,323,092 | 6/1994 | Helfrich et al. .................... 315/371 |

FOREIGN PATENT DOCUMENTS

| | | |
|---|---|---|
| 2387552 | 11/1978 | France . |
| 2150796 | 7/1985 | United Kingdom . |

OTHER PUBLICATIONS

Copy of EPO search report, 3 pages dated Oct. 12, 1995.
Data Sheet TDA 8145 E/W Correction IC, pp. 721–725, Jul. 1991.
Application note TEA2164 pp. 7,8. Jan. 1988.
SMPS Demonstration Board Notes, pp. 5, 6 Mar. 1988.
Data Sheet TDA 4950 E/W Correction IC, pp. 611–615, Jul. 1991.
Imperial 990 TV Receiver 1993 model partial deflection schematic and 2 sheets oscilloscope waveforms.

*Primary Examiner*—Theodore M. Blum
*Attorney, Agent, or Firm*—Joseph S. Tripoli; Joseph J. Laks; Francis A. Davenport

[57] ABSTRACT

A video display apparatus has a controllable, synchronized switch to control current conduction in an inductance. Responsive to a switching signal, a modulator switches the conductive states of the controllable switch. A signal generator is coupled to a source of retrace pulses, for generating at an output a horizontal rate sawtooth signal. The sawtooth signal comprising a first ramp of duration within the first half of the retrace pulse and a second ramp of duration equal to the trace interval. A source of a modulation signal is coupled to a means for generating the switching signal. Responsive to the modulation and sawtooth signals the means generates the switching signal having a first polarity which inhibits conduction in the switch and a second polarity which enables conduction in the switch. The first polarity of switching signal commences within the first half of the retrace interval and the second polarity commences within the remaining time of the horizontal interval.

25 Claims, 4 Drawing Sheets

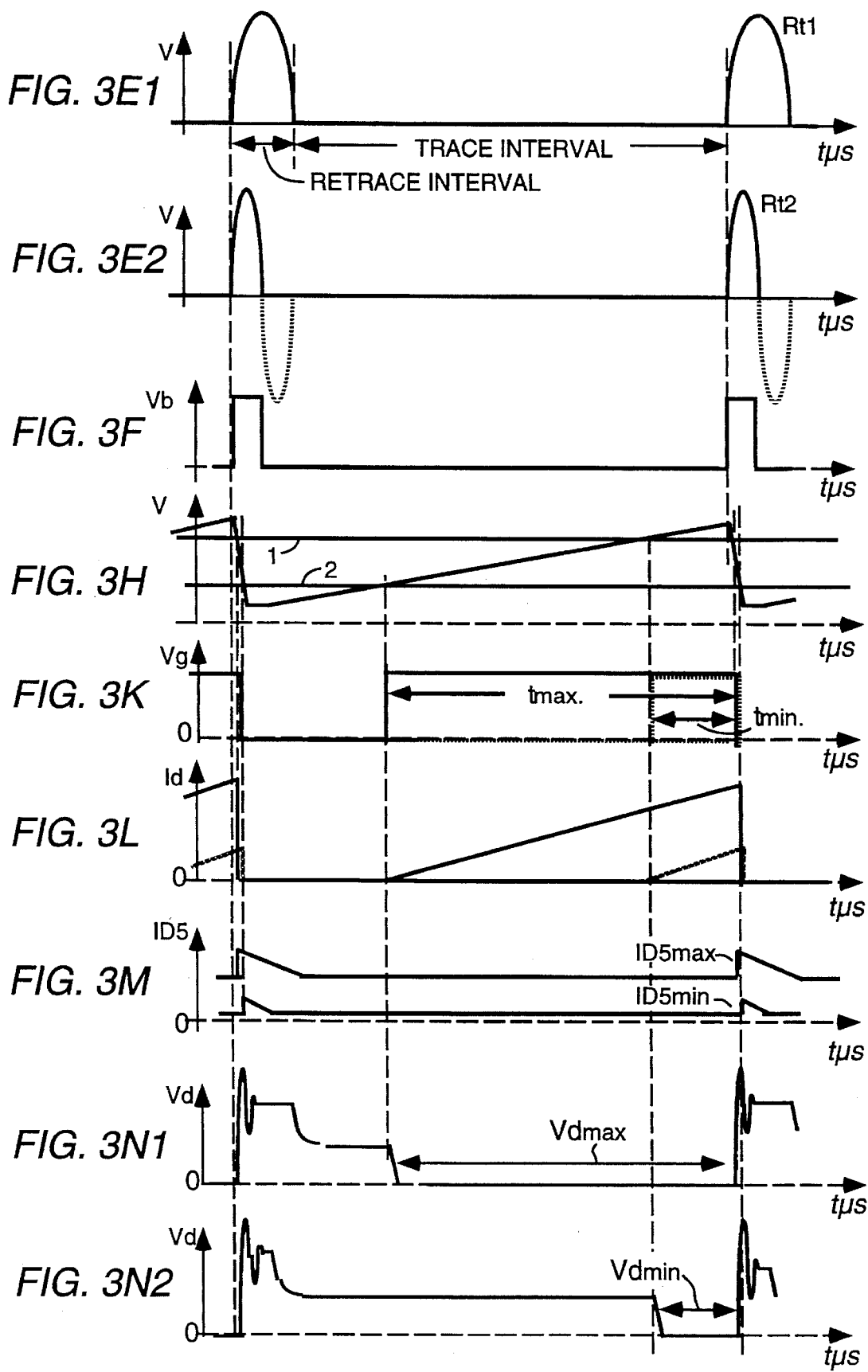

TIMING OF DEFLECTION WAVEFORM CORRECTION CIRCUIT

This is a continuation of application Ser. No. 08/165,202 filed on Dec. 13, 1993 now abandoned.

BACKGROUND OF THE INVENTION

This invention relates to the field of cathode ray tube deflection amplitude control by switched mode circuit and in particular to the synchronization and timing thereof during the horizontal interval.

The control of current flow in an inductance, by use of a switched mode driven circuit, is well known. The inductance may comprise a transformer, a choke or a deflection winding, with current flow therein being controlled by a switching signal. A well known example of the control of current flow in an inductance is the correction of pincushion and trapezium display errors by the use of a switched mode driven diode modulator. The modulator may comprise a class D amplifier where the output signal is integrated and coupled to the deflection circuitry. Such a modulating device is modulated by a constant amplitude signal, having pulses varying in width responsive to the required correction characteristic. For example, in an east-west correction system the modulating pulse repetition frequency is chosen to be synchronous with the horizontal rate, with a width variation or modulation, being determined by a vertical frequency, trapezoidal or parabolic waveform. The switched modulator is coupled to an inductive load, such as a deflection circuit, thus at turn-on the conducted current progressively increases from zero. However, at device turn-off, the energy stored in the inductive load will result in a voltage transient. Circuit techniques are known to minimize the various undesirable effects of such inductive turn off transients. For example, in a video display it is well known to arrange the timing or phasing of the horizontal frequency pulse signal to be such that turn off transients resulting from inductive switching occur during the non-displayed video intervals, thus rendering the transient invisible. However, positioning the transient to occur during a horizontal blanking interval may result in interference with various television signal elements present therein. Furthermore, since the horizontal frequency pulse is width modulated by, for example, a vertical frequency signal, the resulting turn off transient will also vary in position during the blanking interval. Thus, the transient, though not displayed and hidden from view, will move in horizontal position and may interfere with the color reference burst and or the "back porch" clamping interval. Such interference with the reference color burst may result in hue or saturation errors which vary in response to the vertical rate correction signal. Interference present during the "back porch" interval may result in similar vertical rate variations in the black level of the displayed image.

The inductive switch off transient may be coupled into the video signal by a number of different paths. For example, the transient may couple to the video signal via a power supply bus or ground trace. The transient may radiate and couple into the video signal path prior to subsequent processing thus resulting in a perturbation or glitch in the video signal, offset in time from the actual switch-off instant. It is also possible for a radiated turn off transient to be coupled to multiple pick up points, thus resulting in multiple glitches, offset in time one from the other in proportion to the subsequent propagation and signal processing delays encountered by the video signal.

SUMMARY OF THE INVENTION

A video display apparatus has a controllable, synchronized switch to control current conduction in an inductance. A modulator switches conductive states of the controllable switch, responsive to a switching signal. A source of a modulation signal and a source of a horizontal rate signal are coupled to a circuit which generates the switching signal. The switching signal has a first polarity which inhibits conduction in the switch and a second polarity which enables conduction in the switch. The first polarity commences at a predetermined point within the blanking interval and the second polarity commences within the remaining time of the horizontal interval.

BRIEF DESCRIPTION OF THE DRAWINGS

FIG. 3 depicts various waveforms generated by the circuitry of FIG. 2 and occurring during a TV horizontal interval.

DETAILED DESCRIPTION

Figure 1:
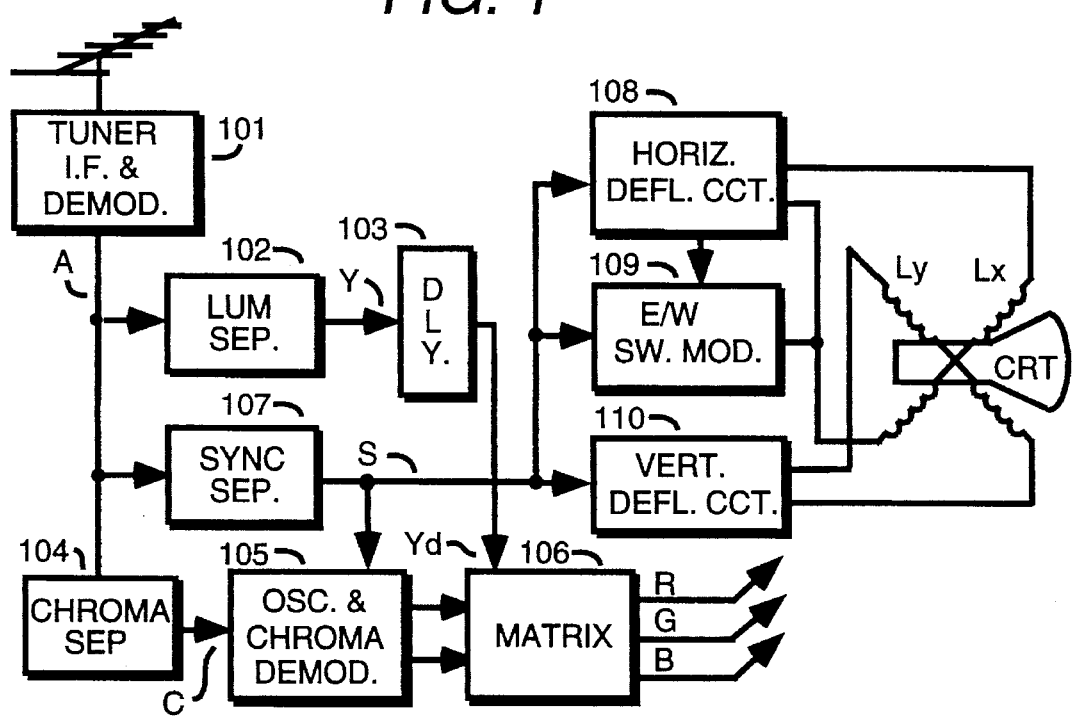
FIG. 1 depicts a partial block diagram of a TV receiver.

FIG. 1 depicts a partial block diagram of a TV receiver which employs east-west horizontal deflection waveform correction. The TV receiver depicted in FIG. 1 has been simplified by the omission of various other sub-systems. The antenna is shown for illustrative purposes to indicate a source TV signals, however, these signals may be provided by other RF or base band systems such as, "cable", VCR, video disc, C. D. ROM, computer, etc. In FIG. 1, a composite video signal A is generated at an outpost of element 101, for example a demodulator. Video signal A is then processed further by a luminance separator 102, to produce a luminance signal Y. Video signal A is also processed by a chrominance separator 104, to derive a modulated chrominance subcarrier signal C.

Synchronizing information is separated from video signal A by a sync separator 107, which generates synchronizing signal S. The synchronizing signal S, is coupled to a horizontal deflection circuit 108, where a horizontal rate signal is derived. Horizontal deflection circuit 108, has an output which is coupled to a deflection winding Lx for horizontal deflection of the CRT electron beam. Deflection winding Lx is also coupled to an east-west correction modulator 109, which controls display amplitude on the CRT. East-west correction modulator 109, is coupled to the sync signal S and to the horizontal deflection circuit 108. The synchronizing signal is coupled to a vertical deflection circuit 110, where a vertical rate signal is derived from signal S. The vertical deflection circuit 110, is coupled to a deflection winding Ly for vertical deflection of the CRT beam.

The chrominance signal C, and sync signal S, are applied an oscillator and demodulator 105. The oscillator is phase locked a color subcarrier reference or burst, which is then used to demodulated encoded color signals present in chrominance signal C. The demodulated color signals and separated delayed luminance signal Yd are fed to a matrix 106, which derives appropriate output signals for display on a CRT, for example, red green and blue signals. The propagation times are different between the separated luminance signal Y, and the demodulated color signals and since signal Y, usually leads and a delay element 103, is usually included in the luminance signal path thus producing delayed luminance signal Yd.

Signal processing and propagation delays differ between receiver manufacturers and between model types. In FIG. 6 waveform A illustrates the horizontal blanking interval of a composite video signal A, and shows the relative timing between the composite video signal A, and the separated encoded chrominance signal C. The delay Δt2, between waveforms A and C of FIG. 4 results from processing, which for example, in one specific TV receiver is approximately 2 microseconds. However, the basic requirement for the display of an encoded color signal is that the luminance component and the demodulated color signal be accurately timed, one with the other, when recombined to generate a color display on the tube face. Thus, a switching transient, generated by a switch mode east-west corrector, may result in unwanted disturbances occurring at times other than that of the turnoff instant. It is well known to arrange signal polarities coupled to a pulse width modulator such that a high current transient, generated at turn off, occurs during the non-displayed part of the horizontal interval, for example the horizontal blanking interval or the horizontal overscan region of the display. However, as described earlier, such positioning of the transient can result in other visible and undesirable impairments of the displayed image.

Figure 2:
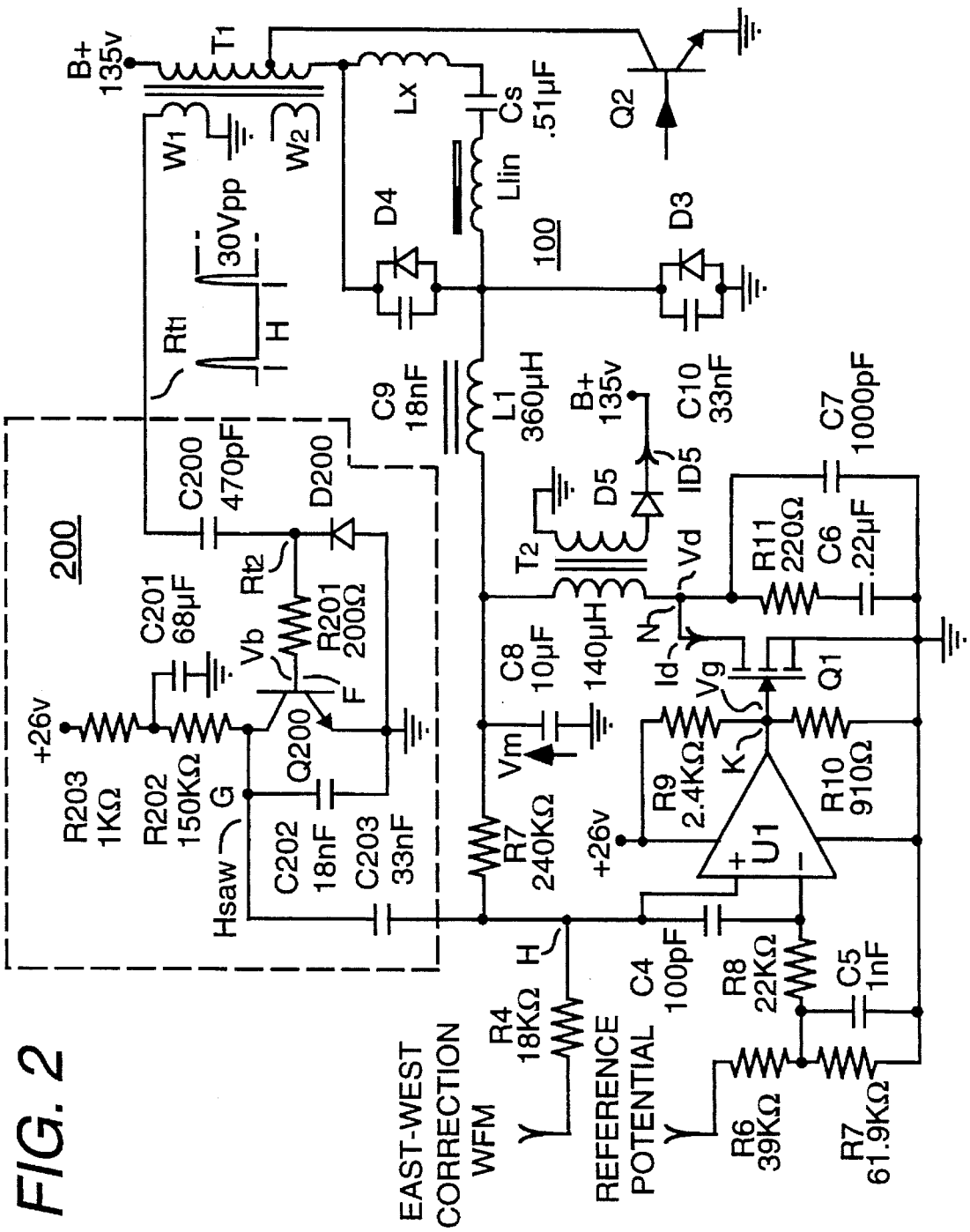
FIG. 2 depicts a switched mode deflection wave form corrector with an inventive embodiment.
Figure 4A:
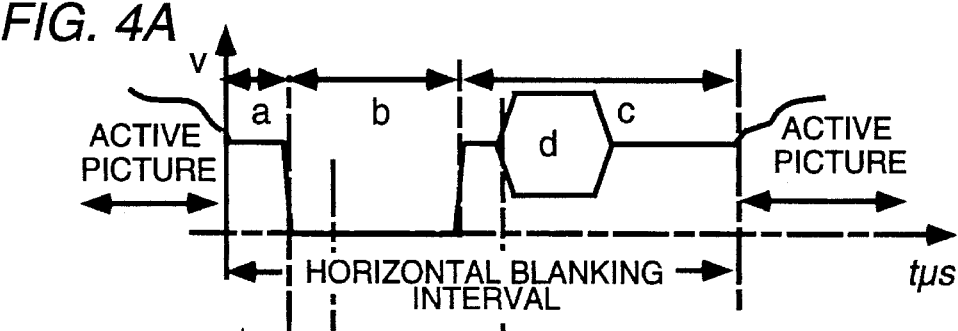
FIG. 4 depicts with an expanded time scale, the various waveforms and their timing relationships occurring during the horizontal blanking interval of FIG. 2.
Figure 4C:
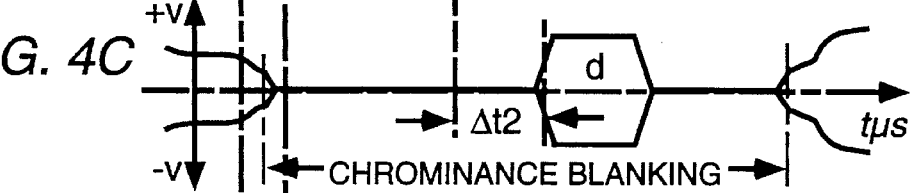
Figure 4E:
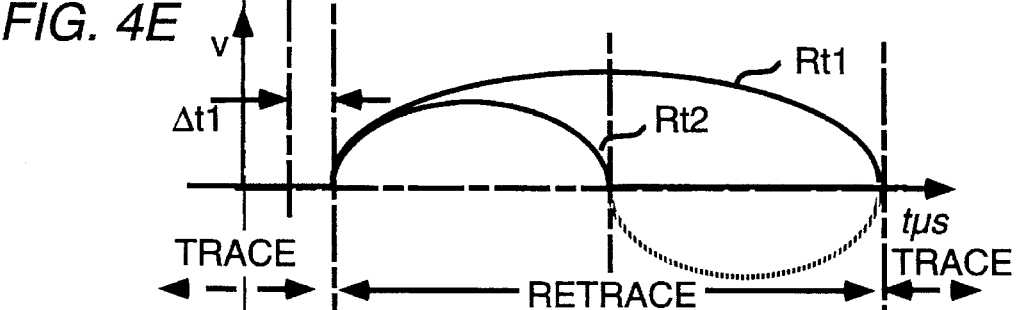
Figure 4F:
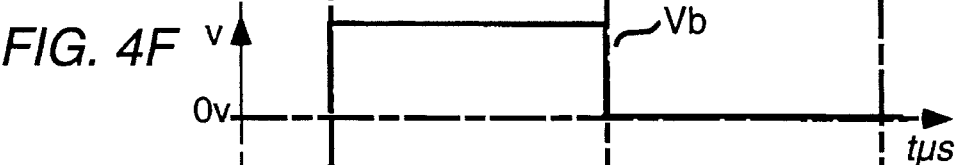
Figure 4G:
Figure 4K:
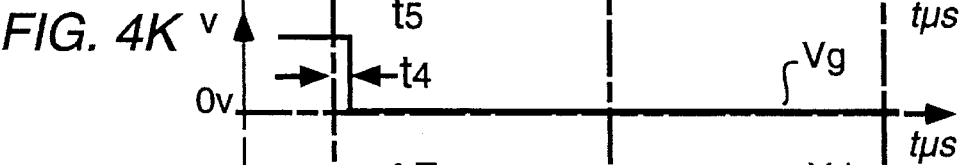
Figure 4N:
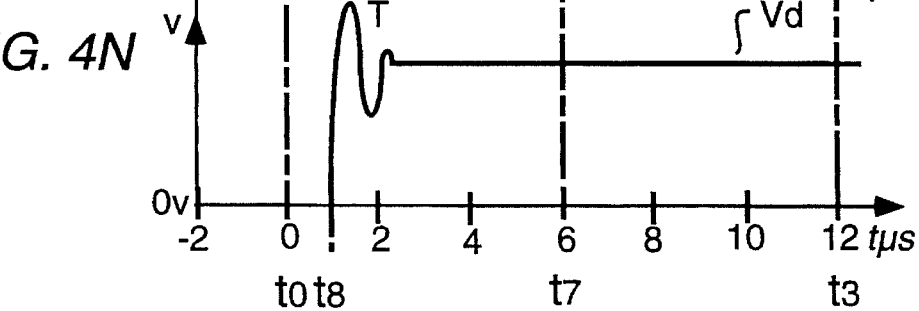

FIG. 2 shows a horizontal deflection circuit with diode modulation for east-west deflection waveform correction including an inventive timing circuit 200. In FIG. 2, a horizontal output transistor Q2 is driven with a pulse signal developed by a signal generator which is not shown. The collector of transistor Q2 is coupled via a horizontal output transformer T1 to a horizontal deflection winding Lx which is coupled to an S correction capacitor Cs and a linearity correction inductor Llin. A diode modulator circuit 100, comprised of diodes D3 and D4 and capacitors C9 and C10 are coupled to the deflection winding and determine both static and dynamic horizontal deflection width. The operation of such a diode modulator is well known. The diode modulator is coupled via choke L1 to a modulating voltage Vm, developed across capacitor C8 and generated by a class D biased, FET amplifier Q1. The FET Q1, is switched by a pulse width modulated signal, generated by voltage comparator U1. The pulse width modulated signal being at horizontal rate and having a width variation modulated by a vertical rate parabolic signal. The operation of a voltage comparator as a pulse width modulator is well known and will be only briefly described. The inverting input of comparator U1 is coupled to a reference potential generated by a source which is not shown. The non-inverting input is coupled to an east-west correction signal, WFM, generated by a generator which is not shown. The east-west correction signal may comprise a DC component for determining static horizontal deflection width, and a vertical frequency parabolic or sawtooth signal for dynamic correction of pincushion or trapezium display distortion. The non-inverting input is also coupled via a capacitor C3 to the inventive timing circuit 200. Negative feedback is applied to the non-inverting input from a filtered output of transistor Q1. When the summed waveform voltage at the non-inverting input exceeds the divided DC reference potential on the inverting input, the comparator output changes state, switching between ground potential and the voltage supply. Thus, the switched output of comparator U1 is coupled to the gate of FET Q1 causing it to switch at the rate of the timing circuit 200, and with a conduction duration determined by the DC width component and the vertical rate correction signal.

A reference potential is coupled via a potential divider formed by resistors R6 and R7, the junction of which is decoupled to ground by a capacitor C5. The divided reference potential is then coupled via series resistor R8, which provides partial input offset current compensation, to the inverting of voltage comparator U1. The non-inverting input of comparator U1 forms a summing point for east-west correction signal WFM, coupled via resistor R4, a horizontal frequency ramp signal Hsaw, generated by timing generator 200 and coupled via capacitor C3, and a negative feedback signal coupled via resistor R7 from a low pass filter formed by transformer T2 primary winding and capacitor C8. A capacitor C4 is coupled between the input terminals of comparator U1 to reduce high frequency signal pickup to reduce spurious output pulse modulation. The output signal from comparator U1 is coupled to the gate electrode of FET Q1. The gate of FET Q1 is biased by a potential divider formed by resistors R9 and R10 connected in series between the 26 volt supply and ground. The potential divider produces a bias voltage of approximately 7 volts, thus the output of comparator U1 switches between 7 volts and ground. When the output of comparator U1 switches to the 7 volt value, FET Q1 is turned on conducting current via transformer T2. When the comparator output is at zero volts FET Q1 is cut off terminating current flow Id. In FIG. 3, waveform K, depicts the gate drive signal at FET Q1.

The drain terminal of FET Q1 is coupled to the primary winding of transformer T2. The primary winding of transformer T2, which may be considered to function as a choke, and is joined to inductor L1, with the junction decoupled to ground by a capacitor C8. Thus, a low pass filter is formed where capacitor C8 develops a vertical frequency modulation signal Vm, for example a parabolic signal, from the width modulated pulse waveform generated by comparator U1. The modulation signal Vm, is coupled via inductor L1, to apply the modulating, or deflection correction signal Vm, to the junction of diodes D4 and D5 which comprise diode modulator 100.

A secondary winding of transformer T2 is coupled to a 135 v, B+ power supply, via an energy recovery diode D5. At the cessation of current flow in FET Q1 and the primary winding of transformer T2, a transient results, shown as T in waveform N of FIG. 4. The transient is transformer coupled to a secondary winding where diode D5 conducts the transient and supplies current to the 135 v B+ power supply. The drain of FET Q1 is also coupled to ground by a capacitor C7 which connected in parallel with a series network comprising resistor R11 and capacitor C6. These components, also known as a snubber circuit, reduce the amplitude of the turn off transient resulting at the cessation of current Id flowing in primary winding of transformer T2 and FET Q1.

The turn off transient T, is comprised of harmonics of the horizontal frequency signal generated by timing generator 200, and each harmonic has modulation sidebands produced by the vertical rate correction signal WFM. This transient may be coupled by various means to various signal nodes in the video, luminance or chrominance systems. Thus, it is desirable that it be reduced in both amplitude and spectral components, and that it be positioned, by means of the switch off timing, in a non-displayed part of the image. However, as discussed previously, the turn off point and hence the horizontal timing of the transient, requires positioning early in the horizontal retrace interval in order to avoid interference with specific parts of the TV signal which occur during the horizontal blanking interval. For example, transient crosstalk into the composite video signal at A in FIG. 1, may result in disturbance to any, or all of the signals constituent therein, i.e. luminance, chrominance and synchronizing signal components. Transient crosstalk into the luminance signal may for example result in black level variation responsive to the vertical correction signal, and cross talk into the chrominance may, for example result in hue and or saturation variations.

Timing circuit 200 shown in FIG. 2 has an input coupled to winding W1 of transformer T1 and an output horizontal frequency ramp signal Hsaw, coupled to the non-inverting input of comparator U1. The horizontal retrace pulse Rt1 is coupled via a capacitor C200 to the cathode of a diode D200 which has the anode connected to ground. The junction of capacitor C200 and diode D200 is connected to the base terminal of a transistor Q200 via a series connected resistor R201. The time constant of capacitor C200 and the equivalent impedance at the junction of resistor R201 and diode D200 forms a network which differentiates retrace pulse Rtl producing pulse Rt2. Diode D200 clamps the negative part of the differentiated signal to ground producing a positive pulse Rt2. The clamped, negative pulse derivative is show by dotted line in waveform E2, of FIG. 3. Pulse Rt2 is generated coincident with the first half or semi period of the retrace pulse Rtl. In FIG. 3, waveforms E1 and E2, illustrate the relative timing of retrace pulses Rtl and Rt2. A capacitor C202 is connected between the collector of transistor Q200 and ground. Capacitor C202 is charged positively from the 26 volt supply via series connected resistors R202 and R203. The junction of resistors R202 and R203 is decoupled to ground by a capacitor C201. Positive pulse Rt2 is coupled via resistor R201 to the base of transistor Q200, causing the transistor to saturate. The base voltage Vb, of transistor Q200 is illustrated in FIG. 3 waveform F. Thus, with transistor Q200 saturated the collector terminal is effectively grounded, rapidly discharging capacitor C203 to ground. Waveform G of FIG. 4, illustrates the rapid discharge of the capacitor voltage which starts coincident with the positive edge of pulse Rt2, and is discharged in approximately 600 nanoseconds., the time interval between t0 and t5. The charging time constant of capacitor C203 and resistors R202 and R203 is long, approximately 2.7 milliseconds, which produces an essentially linear charging ramp. Thus, a horizontal frequency ramp Hsaw, is generated at the collector of transistor Q200, having a negative slope, or short duration ramp, timed to start coincident with the start of the horizontal retrace pulse Rt2 and having a duration of approximately 600 nanoseconds. The waveform has a flat region of approximately 6 microseconds, and a positive slope or long ramp of approximately 57 microseconds.

The horizontal frequency ramp Hsaw, is coupled to the non-inverting input of voltage comparator U1 via a coupling capacitor C203. Capacitor C203 provides DC blocking and reduces capacitive loading effects at comparator U1 input. Capacitive loading to ground at the comparator input is reduced by the series equivalent circuit formed by capacitors C203 and C202. As described above, the non-inverting input of comparator U1 is the summing point for the horizontal ramp Hsaw, vertical correction signal with DC width determining component and the negative feedback signal. FIG. 3, illustrates various signal waveforms occurring during the period of a TV horizontal line. Waveform H shows the horizontal ramp signal Hsaw, generated by circuit 200, intersected by lines 1 and 2. Lines 1 and 2 represent the effective comparator switching thresholds resulting from the summation of the vertical correction signal WFM, and the horizontal ramp Hsaw. FIG. 3, waveform K, illustrates the gate drive signal Vg, applied to FET Q1, where tmax and tmin represent the maximum and minimum values of pulse width modulation occurring responsive to the signal WFM. In FIG. 3, waveform L, illustrates FET Q1 drain current Id, occurring at maximum and minimum pulse widths. In FIG. 3, waveform M, illustrates current ID5 recovered at the turn off of FET Q1, for maximum and minimum pulse widths. The drain voltage of FET Q1 is depicted in FIG. 3, by waveforms N1 and N2, which show the voltage at maximum and minimum pulse widths respectively. At FET Q1 turn off the drain voltage rises rapidly to approximately twice the voltage across capacitor C8. Waveforms N1, Vdmax, and N2, Vdmin, show a damped oscillatory transient T, superimposed on the drain voltage.

FIG. 4 illustrates the relative horizontal timing of retrace pulses Rtl and Rt2, waveform Hsaw, and the turn off transient T, at the FET Q1 drain. To show the relative timings of events occurring during the horizontal deflection retrace interval and the video horizontal blanking interval these various waveforms are shown on the same time axis as composite video waveform A, and separated chrominance signal waveform C. The composite video, waveform A, shows the horizontal blanking interval which comprises various control intervals indicated in FIG. 4 waveform A, by characters a, b and c. Control interval a, is known as the front porch and has an approximate duration of 1.5 microseconds, interval b, is the horizontal synchronizing pulse and has a duration of approximately 4.7 microseconds. Control interval c, is known as the back porch or post sync suppression period and has an approximate duration of 8 microseconds. Located during the back porch interval and occurring shortly after the synchronizing pulse, is a color subcarrier reference burst d, which is comprised of approximately 10 cycles of color subcarrier having a duration of about 2.7 microseconds. In waveform E of FIG. 4, delay $\Delta t1$, represents the delay between the leading edge of a horizontal synchronizing pulse in the composite video A, and the start of the retrace pulse Rtl, which for example, in a specific TV receiver is approximately 1 micro second. In FIG. 3, waveforms E1 and E2 illustrate the operation of circuit 200. In FIG. 4, waveform E, pulses Rtl and Rt2 are superimposed to show that differentiation pulse Rtl generates pulse Rt2 which has half the pulse width or duration of retrace pulse Rtl. The differentiated positive pulse Rt2 is applied to the base of transistor Q200 and is illustrated by waveform F of FIG. 4. Waveform G, of FIG. 4, illustrates the horizontal frequency ramp Hsaw, generated at the collector of transistor Q200, and shows the timing of the negative ramp reset period, t0–t7. However, as described above, capacitor C202 is rapidly discharged during interval t0–t5 and remains shorted to ground potential for the duration of interval t0–t7, corresponding to the positive part of waveform F. The gate signal Vg, of FET Q1, illustrated in waveform K, is delayed slightly in time by an interval t0–t4, relative to the rising edge of waveform F. This delay results from the action of the vertical correction signal WFM, and the steep, but finite, negative slope of ramp waveform G. However, for illustrative purposes the effects of the vertical modulation has been ignored in waveform K, of FIG. 4. The negative transition of the gate signal Vg, causes FET Q1 to start to turn off, however comparator U1 must remove charge from the gate of FET Q1. Thus FET Q1 turn off is delayed by approximately 1 micro second, interval t0–t8 in waveform N, of FIG. 4. The drain voltage Vd, of FET Q1, is shown FIG. 4 waveform N, and rises rapidly from approximately ground potential, (in fact Id × Q1RDSon volts), to an inductively generated transient T, which exhibits a damped oscillation about a DC value of approximately twice the average voltage Vm, across capacitor C8.

FIG. 4 depicts on common time axes, the FET turn off transient T, relative to the retrace pulse Rtl, the composite video signal A and the separated chrominance signal C. Timing circuit 200 processes the retrace pulse to generate the turn off signal and resulting transient T within the first half of retrace pulse Rtl. In addition, the positioning of turn off early in the retrace period not only positions the transient to avoid display, but advantageously locates the transient within the horizontal blanking interval of the video signal A, during the synchronizing pulse interval b, shown in waveform A of FIG. 4. Thus, the positioning of the transient within the interval b, of the horizontal sync pulse renders the display and synchronizing systems immune to spurious operation due to transient interference or crosstalk. Similarly for the chrominance signal C, the turn off transient occurs during a chrominance blanking interval before the occurrence of the color reference burst d, thus interference with color synchronization is avoided.

What is claimed is:

1. A video display apparatus with a synchronized switched inductance, comprising:

an inductance;

a controllable switch coupled to said inductance to control current conduction therein;

a modulator for switching conductive states of said controllable switch, responsive to a switching signal;

a source of a modulation signal;

a source of horizontal deflection retrace pulses;

a signal generator coupled to said source of retrace pulses for generating a horizontal rate ramp signal having a first polarity ramp of duration less than a duration of the first half of said retrace pulse; and means responsive to said modulation and horizontal rate ramp signals for generating said switching signal having a first polarity, which inhibits conduction in said switch and a second polarity which enables conduction in said switch, said first polarity commencing in accordance with said modulation signal and said horizontal rate ramp signal only during said first half of said retrace pulse.

2. The video display apparatus of claim 1, wherein switch conduction ceases during a horizontal blanking interval prior to the occurrence of a back porch interval.

3. The video display apparatus of claim 1, wherein switch conduction ceases during a horizontal synchronizing pulse interval.

4. The video display apparatus of claim 1, wherein switch conduction ceases during a chrominance horizontal blanking interval prior to the occurrence of a color subcarrier reference burst.

5. The video display apparatus of claim 1, wherein said signal generator further comprises a differentiating circuit coupled to said source of horizontal deflection retrace pulses for generating a second pulse within said first half of said retrace pulse.

6. The video display apparatus of claim 5, wherein said differentiating circuit generates said second pulse within the first half of said retrace interval.

7. The video display apparatus of claim 5, wherein said signal generator further comprises a switch coupled in shunt with a capacitor, said pulse being coupled to control said switch to change charge in said capacitor.

8. The video display apparatus of claim 1, wherein said inductance comprises a transformer winding.

9. The video display apparatus of claim 1, wherein said controllable switch is coupled to said inductance to control deflection current.

10. The video display apparatus of claim 9, wherein said modulation signal comprises a vertical frequency signal.

11. The video display apparatus of claim 10, wherein said switching signal comprises a pulse of horizontal frequency and width which varies responsive to said vertical frequency signal.

12. The video display apparatus of claim 11, wherein said deflection current is varied responsive to said width variation of said switching signal.

13. A video display apparatus with a synchronized switched inductance, comprising:

an inductance;

a controllable switch coupled to said inductance to control current conduction therein;

a modulator for switching conductive states of said controllable switch, responsive to a switching signal;

a source of a modulation signal;

means for generating a horizontal rate pulse signal having a duration less than a duration of the first half of a retrace pulse; and, means responsive to said modulation and said horizontal rate pulse signals for generating said switching signal having a first polarity which inhibits conduction in said switch and a second polarity which enables conduction in said switch, said second polarity commencing within an active picture interval of a video display signal, and said first polarity commencing within said horizontal rate pulse and during a horizontal blanking interval of said video display signal before a back porch interval.

14. The video display apparatus of claim 13, wherein said means for generating a horizontal rate signal further comprises a source of a horizontal deflection retrace pulse coupled to means for generating a second pulse within the first half of said retrace pulse.

15. The video display apparatus of claim 13, wherein said modulation signal comprises a vertical frequency signal.

16. The video display apparatus of claim 15, wherein said switching signal comprises a pulse of horizontal frequency having a width which varies responsive to said vertical frequency signal.

17. The video display apparatus of claim 16, wherein said current conduction is varied responsive to said width variation of said switching signal.

18. A video display apparatus with a synchronized switched inductance, comprising:

an inductance;

a controllable switch, coupled to said inductance to control current conduction therein;

a modulator for switching conductive states of said controllable switch, responsive to a switching signal;

a source of a modulation signal; a ramp generator coupled to a source of horizontal retrace pulses and generating therefrom a ramp signal having first polarity ramp responsive to a first time constant and a second polarity ramp responsive to a second time constant; and, means responsive to said modulation signal and said ramp signal for generating said switching signal having a first polarity which inhibits conduction in said switch and a second polarity which enables conduction in said switch.

19. The video display apparatus of claim 18, wherein said ramp generator further comprises a differentiator coupled to said source of said retrace pulses for generating a second pulse within the first half of each of said retrace pulses.

20. The video display apparatus of claim 18, wherein said modulation signal comprises a vertical frequency signal.

21. The video display apparatus of claim 20, wherein said switching signal comprises a pulse of horizontal frequency having a width which varies responsive to said vertical frequency signal.

22. The video display apparatus of claim 21, wherein said current conduction is varied responsive to said width variation of said switching signal.

23. The video display apparatus of claim 18, wherein said second polarity of said switching signal commences within an active picture interval of a video display signal, and said first polarity of said switching signal commences in a horizontal blanking interval of said video display signal between a leading edge of a horizontal frequency synchronizing pulse and a color subcarrier reference burst.

24. The video display apparatus of claim 18, further comprising a separated chrominance signal channel, said first polarity of said switching signal being generated with a horizontal position relative to said separated chrominance signal channel such that conduction in said switch is inhibited during a blanking interval in said separated chrominance signal channel prior to an occurrence of said burst of color subcarrier reference.

25. A video display apparatus with a synchronized switched inductance, comprising:

an inductance;

a controllable switch coupled to said inductance to control current conduction therein responsive to a switching signal;

a diode modulator coupled to said inductance for deflection correction;

a source of a modulation signal;

a source of horizontal deflection retrace pulses;

a ramp generator coupled to said source of retrace pulses for generating a horizontal rate ramp signal; and means responsive to said modulation and horizontal rate ramp signals for generating said switching signal having a first polarity which inhibits conduction in said switch and a second polarity which enables conduction in said switch, said first polarity commencing only during the first half of said retrace pulse and said second polarity commencing within an active picture interval of a video display signal.

* * * * *